(12) United States Patent
Salokannel et al.

(10) Patent No.: US 7,254,399 B2
(45) Date of Patent: Aug. 7, 2007

(54) TECHNIQUES FOR INTERFERENCE REDUCTION IN WIRELESS COMMUNICATIONS NETWORKS

(75) Inventors: Juha Salokannel, Tampere (FI); Janne Tervonen, Espoo (FI); Janne Marin, Espoo (FI); Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 106 days.

(21) Appl. No.: 10/961,092

(22) Filed: Oct. 12, 2004

(65) Prior Publication Data

US 2006/0077939 A1 Apr. 13, 2006

(51) Int. Cl.
*H04Q 7/20* (2006.01)
*H04J 11/00* (2006.01)
*H04J 3/06* (2006.01)

(52) U.S. Cl. ............... 455/452.2; 370/203; 370/350
(58) Field of Classification Search ............ 455/452.2, 455/11.1; 370/254, 350, 343, 338, 336, 347, 370/360, 203; 375/261, 134
See application file for complete search history.

(56) References Cited

U.S. PATENT DOCUMENTS

| | | | |
|---|---|---|---|
| 6,208,635 B1 * | 3/2001 | Altvater et al. | 370/343 |
| 6,671,495 B1 | 12/2003 | Lappeteläinen et al. | |
| 6,795,424 B1 * | 9/2004 | Kapoor et al. | 370/343 |
| 7,020,069 B1 * | 3/2006 | Pollack et al. | 370/203 |
| 7,110,380 B2 * | 9/2006 | Shvodian | 370/336 |
| 2002/0193072 A1 | 12/2002 | Alinikula et al. | |
| 2003/0174690 A1 * | 9/2003 | Benveniste | 370/350 |
| 2004/0170217 A1 * | 9/2004 | Ho | 375/134 |
| 2004/0218683 A1 * | 11/2004 | Batra et al. | 375/261 |
| 2004/0233858 A1 * | 11/2004 | Karaoguz | 370/254 |
| 2005/0136834 A1 * | 6/2005 | Bonta et al. | 455/11.1 |
| 2006/0045053 A1 * | 3/2006 | Erlich et al. | 370/338 |

FOREIGN PATENT DOCUMENTS

| EP | 1392023 A2 | 2/2004 |
|---|---|---|
| EP | 1589781 A2 | 10/2005 |

OTHER PUBLICATIONS

O'Conor, J. (ed.), MBOA Wireless Medium Access Control (MAC) Specifications for High Rate Wireless Personal Area Networks (WPANs), Multiband OFDM Alliance MAC Subcommittee, Draft 0.62, Sep. 2004.
Wason, P., Jogi, S., Choudhary, M. Enhanced DRP for MBOA MAC. Technical proposal in MBOA MAC forum, May 2004.

* cited by examiner

*Primary Examiner*—Joseph Feild
*Assistant Examiner*—Kiet Doan
(74) *Attorney, Agent, or Firm*—Morgan & Finnegan, L.L.P.

(57) ABSTRACT

The present invention provides techniques for responding to overlapping conditions in wireless communications networks include receiving data transmissions from a transmitting device across a wireless communications network. These data transmissions correspond to a connection with the transmitting device and occur within a reserved portion of a communications resource. An interference condition is detected that includes an allocation of the communications resource for a neighboring device that overlaps with the reserved portion. Based on this detection, the method sends a notification to the transmitting device, the notification indicating the presence of overlapping transmissions in the reserved portion of the communications resource.

40 Claims, 9 Drawing Sheets

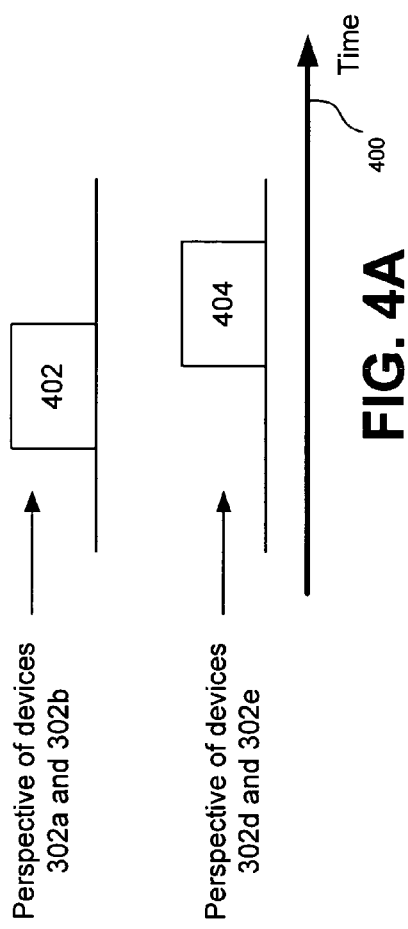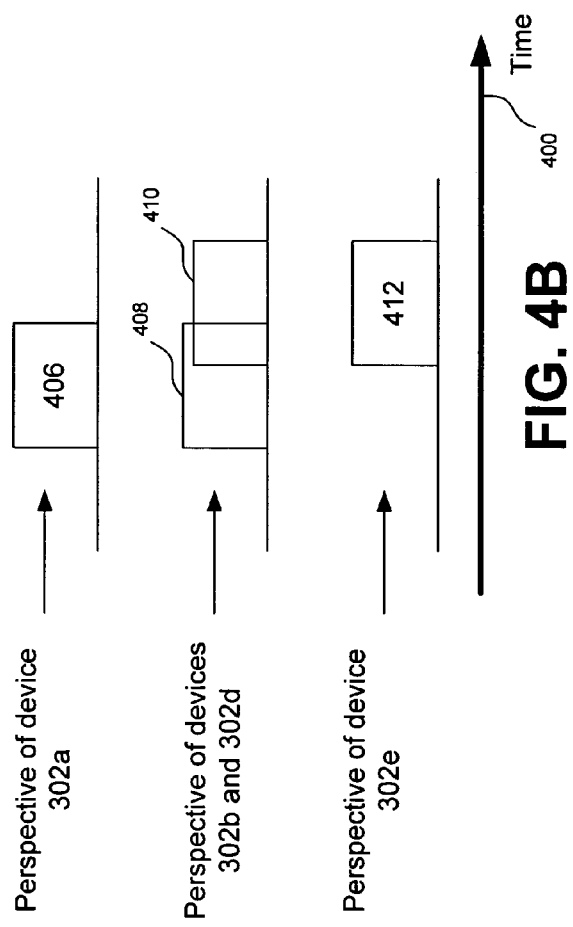

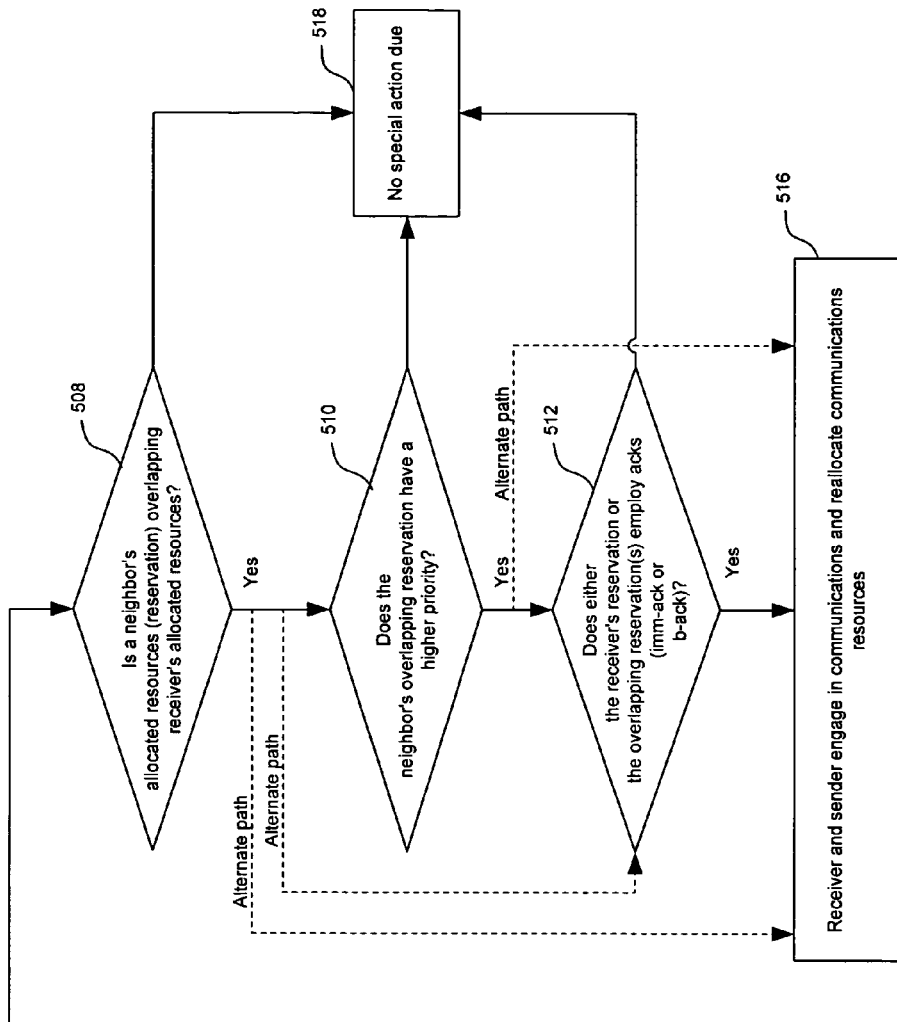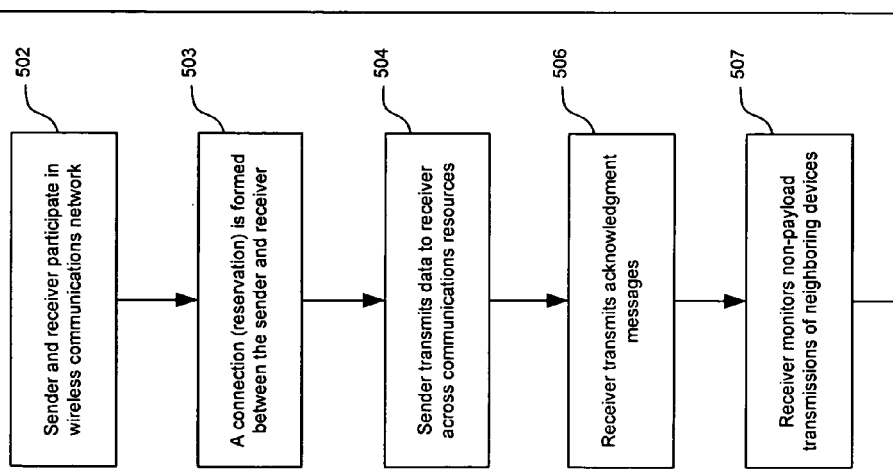
FIG. 5

US 7,254,399 B2

TECHNIQUES FOR INTERFERENCE REDUCTION IN WIRELESS COMMUNICATIONS NETWORKS

FIELD OF THE INVENTION

The present invention relates to wireless communications. More particularly, the present invention relates to techniques for reducing interference of transmissions in wireless communications networks.

BACKGROUND OF THE INVENTION

Short-range wireless proximity networks typically involve devices that have a communications range of one hundred meters or less. To provide communications over long distances, these proximity networks often interface with other networks. For example, short-range networks may interface with cellular networks, wireline telecommunications networks, and the Internet.

A high rate physical layer (PHY) standard is currently being selected for IEEE 802.15.3a. The existing IEEE 802.15.3 media access control layer (MAC) is supposed to be used as much as possible with the selected PHY. Currently, there are two remaining PHY candidates. One of these candidates is based on frequency hopping application of orthogonal frequency division multiplexing (OFDM). The other candidate is based on M-ary Binary offset Keying. The OFDM proposal is called Multiband OFDM (MBO). Moreover, in order to further develop the OFDM proposal outside of the IEEE, a new alliance has been formed called the MultiBand OFDM Alliance (MBOA).

MBO utilizes OFDM modulation and frequency hopping. MBO frequency hopping may involve the transmission of each of the OFDM symbols at various frequencies according to pre-defined codes, such as Time Frequency Codes (TFCs). Time Frequency Codes can be used to spread interleaved information bits across a larger frequency band.

Presently, there is an interest within the MBOA to create a Medium Access Control (MAC) layer that would be used with the OFDM physical layer instead of the IEEE 802.15.3 MAC layer. A current version of the MBOA MAC involves a group of wireless communications devices (referred to as a beaconing group) that are capable of communicating with each other. The timing of beaconing groups is based on a repeating pattern of "superframes" in which the devices may be allocated communications resources.

MAC layers govern the exchange among devices of transmissions called frames. A MAC frame may have various portions. Examples of such portions include frame headers and frame bodies. A frame body includes a payload containing data associated with higher protocol layers, such as user applications. Examples of such user applications include web browsers, e-mail applications, messaging applications, and the like.

In addition, MAC layers govern the allocation of resources. For instance, each device requires an allocated portion of the available communication bandwidth to transmit frames. The current MBOA MAC proposal provides for the allocation of resources to be performed through communications referred to as beacons. Beacons are transmissions that devices use to convey non-payload information. Each device in a beaconing group is assigned a portion of bandwidth to transmit beacons.

Such transmissions allow the MBOA MAC to operate according to a distributed control approach, in which multiple devices share MAC layer responsibilities. A channel access mechanism, referred to as the Distributed Reservation Protocol (DRP) is an example of such shared responsibility. DRP includes basic tools for establishing and terminating a unidirectional connection between two or more devices.

In a distributed network, a device making a reservation for a connection with another device may not be aware of the reservations of the devices around the other device. Therefore, the MBOA MAC provides for an Availability Information Element (AIE), which indicates the usage of communications resources from other device's perspective.

The current MBOA MAC Specification (version 0.62, September 2004) only requires an AIE to be sent in limited circumstances involving establishment of a new connection. Otherwise, it is optional to send the AIE. However, the mobility of devices may cause previously acceptable resource allocations to become ones that cause significant interference.

There has been a proposal for devices to transmit AIEs in every superframe. Although such an approach would reduce interference, it would also cause several problems. Such problems include the overloading of bandwidth allocated for beacon transmissions. This overloading would obstruct the sending of other important beacon transmissions. Accordingly, techniques are needed for the reduction of interference that do not waste communications resources.

SUMMARY OF THE INVENTION

The present invention provides techniques for responding to overlapping conditions in wireless communications networks. For example, a method of the present invention receives data transmissions from a transmitting device across a wireless communications network. These data transmissions correspond to a connection with the transmitting device and occur within a reserved portion of a communications resource. The method further detects an interference condition that includes an allocation of the communications resource for a neighboring device overlapping with the reserved portion. Based on this detection, the method sends a notification to the transmitting device, the notification indicating the presence of overlapping transmissions in the reserved portion of the communications resource.

In addition, the present invention provides a computer program product comprising program code to enable a processor to perform, for example, the features of the method.

An apparatus of the present invention includes a receiver, a controller, and a transmitter. The receiver receives data transmissions from a transmitting device across a wireless communications network. These data transmissions correspond to a connection with the transmitting device and occur within a reserved portion of a communications resource. The controller detects an interference condition that includes an allocation of the communications resource for a neighboring device that overlaps with the reserved portion. The transmitter sends a notification to the transmitting device that indicates the presence of overlapping transmissions in the reserved portion of the communications resource.

In addition, the present invention provides an apparatus having a transmitter, a receiver, a memory and a processor. The receiver receives data transmissions from a transmitting device across a wireless communications network that corresponds to a connection with the transmitting device and occurring within a reserved portion of a communications resource. The memory stores instructions for the processor to detect an interference condition that includes an allocation of the communications resource for a neighboring device that overlaps with the reserved portion. The transmitter sends a notification to the transmitting device, the notification indicating the presence of overlapping transmissions in the reserved portion of the communications resource.

Additionally, the interference condition may further include the allocation of the communications resource for the neighboring device having a higher priority than the connection with the transmitting device. Also, the interference condition may further include the allocation of the communications resource for the neighboring device having an acknowledgment setting.

The notifications sent to the transmitting device may be in the form of an availability information element (AIE) and or a modified distributed reservation protocol information element (DRP IE)

Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 4A and 4B are diagrams showing an exemplary resource allocations for the connections of a wireless communications network;

FIG. 5 is a flowchart of a device operation, according to an embodiment of the present invention;

DETAILED DESCRIPTION OF THE PREFERRED EMBODIMENTS

I. Operational Environment

Figure 1:
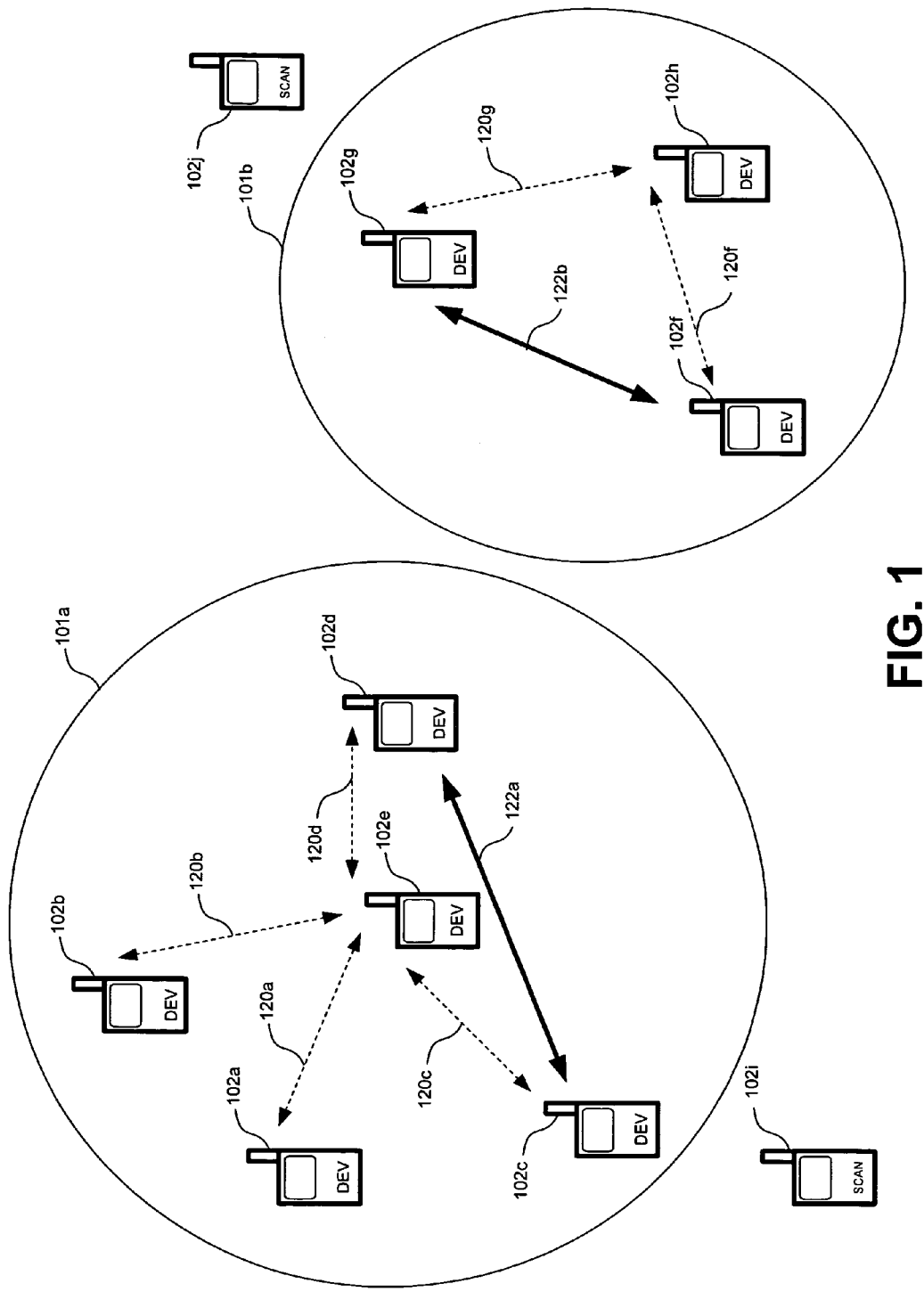
FIG. 1 is a diagram of an exemplary operational environment.

Before describing the invention in detail, it is first helpful to describe an environment in which the present invention may be employed. Accordingly, FIG. 1 is a diagram of an exemplary operational environment. This environment includes multiple beaconing groups 101, each having a plurality of devices 102. For instance, FIG. 1 shows a beaconing group 101a, which includes member devices (DEVs) 102a-e. FIG. 1 also shows a beaconing group 101b, which includes DEVs 102f, 102g, and 102h.

In beaconing group 101a, each of DEVs 102a-d may communicate with DEV 102e across a corresponding link 120. For instance, FIG. 1 shows DEVs 102a communicating with DEV 102e across a link 120a. In addition, in beaconing group 101a, each of devices 102a-e may communicate with each other directly. For instance, FIG. 1 shows DEVs 102c and 102d communicating via a direct link 122a.

In beaconing group 101b, each of DEVs 102f and 102g may communicate with DEV 102h across a corresponding link 120. For instance, DEV 102f communicates with DEV 102h across a link 120f, while DEV 102g communicates with DEV 102h across a link 120g. DEVs 102f and 102g in beaconing group 101b may also communicate with each other. For example, FIG. 1 shows DEVs 102f and 102g communicating across a link 122b.

Each of links 122 and 120 may employ various frequency hopping patterns. These patterns may include, for example, one or more Time Frequency Codes (TFCs). In embodiments of the present invention, each beaconing group 101 employs a particular frequency hopping pattern. These patterns may either be the same or different.

Figure 2:
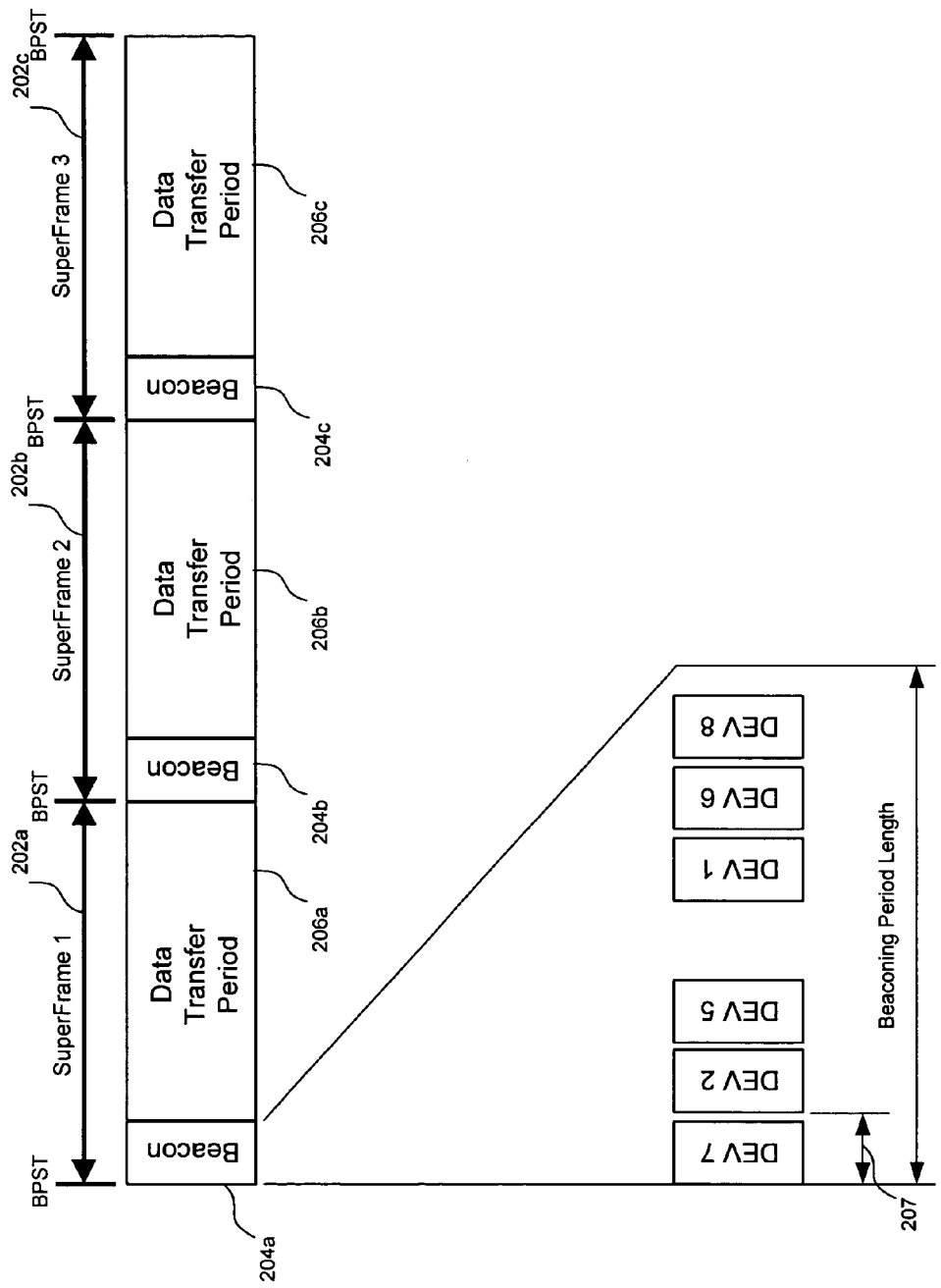
FIG. 2 is a diagram showing an exemplary MBOA superframe format.

Transmissions of beaconing groups 101a and 101b are each based on a repeating pattern called a superframe. Accordingly, FIG. 2 is a diagram showing an exemplary MBOA superframe format. In particular, FIG. 2 shows a frame format having superframes 202a, 202b, and 202c. As shown in FIG. 2, superframe 202b immediately follows superframe 202a, and superframe 202c immediately follows superframe 202b.

Each superframe 202 includes a beacon period 204 and a data transfer period 206. Beacon periods 204 convey transmissions from each of the active devices in the beaconing group. Accordingly, each beacon period 204 includes multiple beacon slots 207, each corresponding to a particular device in the beaconing group. During these slots, the corresponding device may transmit various overhead or networking information.

For instance, such information may be used to set resource allocations and to communicate management information for the beaconing group. In addition, according to the present invention, data transfer periods 206 may be used to transmit information regarding services and features (e.g., information services, applications, games, topologies, rates, security features, etc.) of devices within the beaconing group. The transmission of such information in beacon periods 204 may be in response to requests from devices, such as scanning devices.

Data transfer period 206 is used for devices to communicate data according to, for example, frequency hopping techniques that employ OFDM and/or TFCs. For instance, data transfer periods 206 may support data communications across links 120 and 122. In addition, devices (e.g., DEVs 102a-e) may use data transfer periods 206 to transmit control information, such as request messages to other devices. To facilitate the transmission of traffic, each DEV may be assigned a particular time slot within each data transfer period 206. In the context of the MBOA MAC specification, these time slots are referred to as media access slots (MASs).

A MAS is a period of time within data transfer period 206 in which two or more devices are protected from contention access by devices acknowledging the reservation. MASs may be allocated by a distributed protocol, such as the distributed reservation protocol (DRP).

II. Interference Scenarios

Figure 3A:
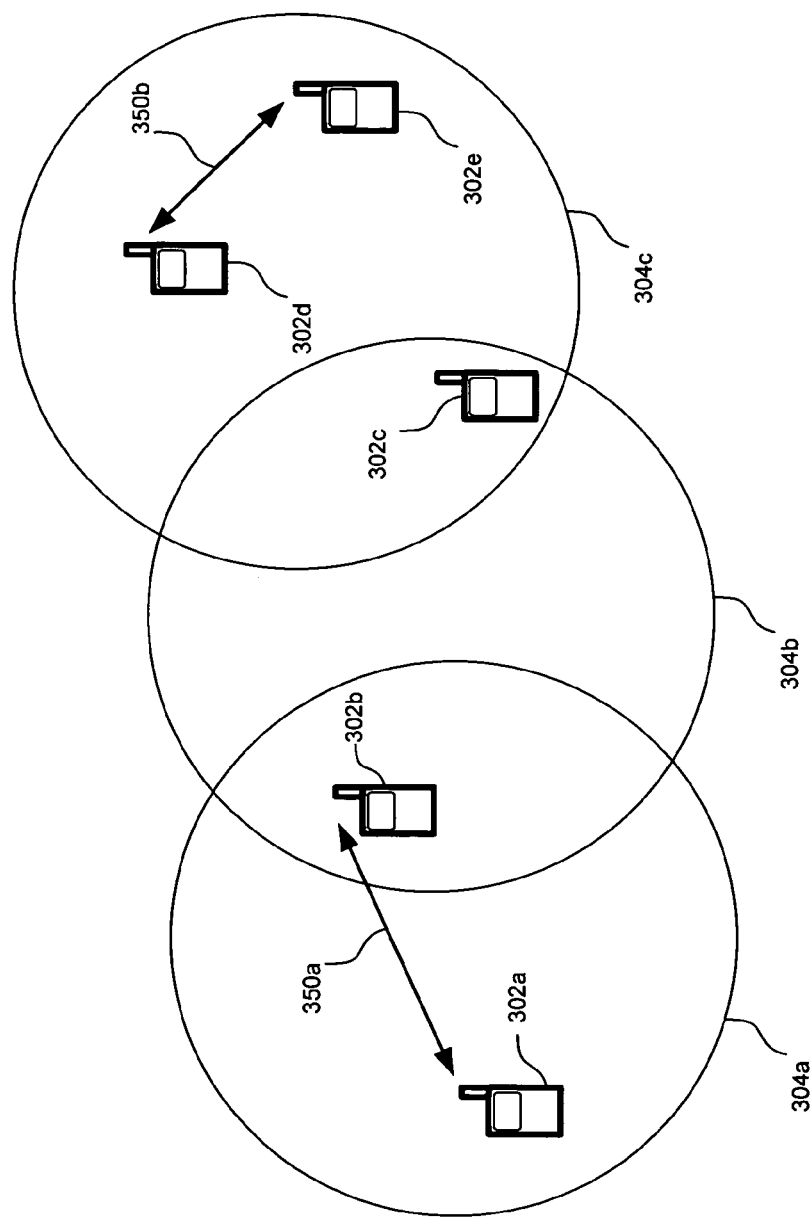
FIGS. 3A and 3B are diagrams of an exemplary communications scenario.
Figure 3B:
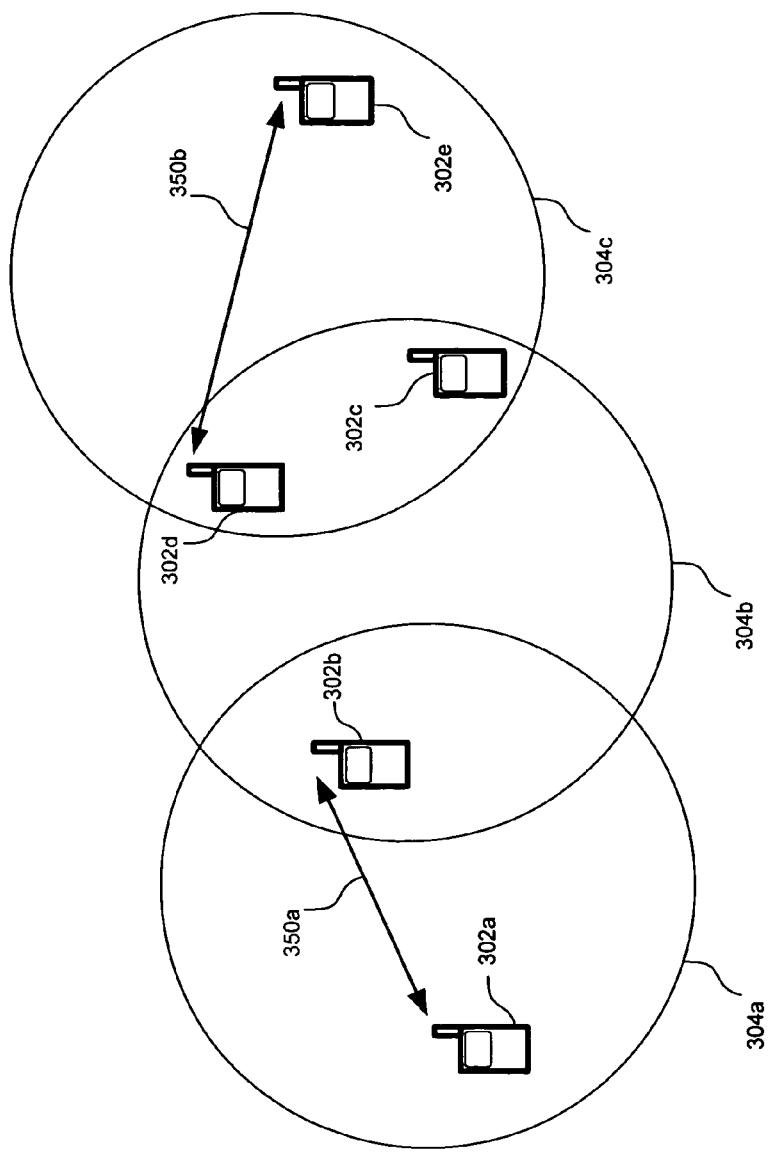

FIGS. 3A and 3B are diagrams of an exemplary communications scenario in which several devices 302 participate in a short-range wireless communications network 300, such as a beaconing group 101. According to this scenario, FIG.

3A shows an initial arrangement of communications devices. A subsequent arrangement of these devices is shown in FIG. 3B.

Referring to FIG. 3A, an initial set of conditions is shown. These initial conditions include a device 302a having a connection 350a with a device 302b, and a device 302d having a connection 350b with a device 302e. Traffic may be transferred across connections 350 in various ways. For example, an exemplary connection 350 includes a transmitting device (also referred to a sender) and a receiving device (also referred to as a receiver).

The transmitting device sends data to the receiving device. In response, the receiving device may send information, such as acknowledgment messages to indicate reception of the transmitted data. The data and acknowledgment messages are transferred across an allocated portion of the available communications bandwidth, such as portion(s) of a superframe's data transfer period. As an illustrative example, device 302a is a sender and device 302b is a receiver for connection 350a. For connection 350b, device 302e is a sender and device 302d is a receiver.

Each of devices 302 sends a beacon transmission during a beacon period, such as the beacon period of the superframe defined by the MBOA MAC. In addition, for each connection 350, the participating devices 302 communicate data. These data communications may be, for example, during the data transmission portion of the superframe defined by the MBOA MAC.

For purposes of illustration, FIGS. 3A and 3B include circles 304, each representing spatial areas or locations. Devices that are within each particular circle 304 can receive each other's transmissions. For instance, FIG. 3A shows that devices 302a and 302b can receive each other's transmissions because they are within circle 304a. In a similar manner, devices 302b and 302c can receive each other's transmissions because the devices are both within circle 304b. Moreover, devices 302c, 302d, and 302e can receive each other's transmissions because they are within circle 304c.

Due to the mobility of devices 302, the communications environment may change, for example, FIG. 3B shows that device 302d has moved within circle 304b. Hence, device 302d can now receive communications from devices 302b, 302c, and 302e. If the data communication schedules (e.g., DRP reservations) of connections 350a and 350b overlap in time, then communications across one or both of these connections will be subjected to severe interference.

FIGS. 4A and 4B show exemplary transmission time allocations (e.g., DRP schedule) for the connections of network 300. These allocations are shown along a time axis 400 from the perspective of difference devices. In particular, FIG. 4A shows device perspectives at the initial conditions of FIG. 3A, while FIG. 4B shows device perspectives at the subsequent conditions of FIG. 3B.

Referring to FIG. 4A, an allocation perspective 402 for connection 350a is shown from the frame of reference of devices 302a and 302b. In addition, FIG. 4A shows an allocation perspective 404 for connection 350b from the frame of reference of devices 302d and 302e. It is apparent from these perspectives that the data communication allocations for connections 350a and 350b overlap in time. However, from the perspectives of devices 302a, 302b, 302d, and 302e, these allocations do not interfere with each other during the initial conditions of FIG. 3A. This is because, for these initial conditions, devices 302a and 302b can not receive transmissions from devices 302d and 302e, and vice versa.

However, for the subsequent conditions of FIG. 3B, interference occurs. In particular, FIG. 4B shows an allocation perspective 406 from the frame of reference of device 302a, allocation perspective 408 and 410 from the frame of reference of devices 302b and 302d, as well as an allocation perspective 412 from the frame of reference of device 302e.

As shown by allocation perspectives 406 and 412, transmissions (e.g., data) from device 302b to device 302a and from device 302e to device 302d are not interfered upon. However, allocation perspectives 408 and 410 show that transmissions from device 302a to device 302b and from device 302e to device 302d interfere with each other. However, due to the transmission environment of network 300, devices 302a and 302e cannot identify the source of this interference (which may manifest itself as a reduction in throughput).

In these situations, the devices that are prone to experiencing such interference can observe the overlapping allocation patterns and identify interference sources by receiving and processing the beacon transmissions from its neighboring devices. Accordingly, embodiments of the present invention provide for devices to communicate such interference sources to devices with which they share connections.

III. Operation

FIG. 5 is a flowchart of an operation according to aspects of the present invention. This operation involves the interaction between a first device (the sender) and a second device (the receiver). In this operation, the receiver informs the sender if one or more interfering conditions exist. Based on such notifications, the interfering conditions can be removed. The operation of FIG. 5 is described in the context of an MBOA network, such as a beaconing group 101 of FIG. 1. However, this operation may be used also in other contexts.

As shown in FIG. 5, this operation includes a step 502 in which the sender and receiver participate in a wireless communications network, such as a beaconing group 101. Accordingly, each of these devices is allocated non-payload communications resources, such as a beacon slot.

In a step 503, a connection is formed between the sender and the receiver. This connection includes an allocation of communication resources (e.g., one or more portions of a superframe's data transfer period). In an MBOA network, such allocations may be performed according to the distributed reservation protocol (DRP).

DRP allows devices to make a reservation for a certain period of the data portion of the superframe. The establishment of a reservation is referred to as DRP negotiation. To establish and maintain the reservation (or connection) a device requesting a reservation (e.g., the sender) transmits a DRP information element (DRP IE) during its beacon slot. The other device(s) in the connection (e.g., the receiver) also transmits the DRP IE in its beacon slot. Both of these devices transmit the DRP IE in their respective beacon slots of each superframe during the existence of the reservation.

In a step 504, the sender transmits data to the receiver across the allocated communications resources (e.g., an existing DRP reservation). In embodiments, this step comprises receiving one or more data transmissions within the resources allocated to the connection between these devices. Upon the reception of such transmissions, the receiver may transmit corresponding acknowledgment messages to the sender in a step 506. These data transmissions and acknowledgments may be in the form of OFDM signals.

In a step 507, the receiver monitors the non-payload transmissions (e.g., beacon transmissions) of any neighboring devices (i.e., devices from which the receiver can obtain transmissions). This monitoring includes receiving connection information for the neighboring device(s). Such connection information includes resources allocated to these devices for communications. In embodiments, this connection information is in the form of DRP IEs. As discussed above, a DRP IE defines which particular slots are being used by a beaconing device.

Based on this monitoring, the receiver determines whether one or more reallocation conditions exist. Examples of such conditions are described below with reference to steps 508 through 512.

FIG. 5 shows that in step 508, the receiver determines whether an allocation (e.g., a DRP reservation) of a neighboring device is overlapping with the resource allocations (e.g., DRP reservation) belonging to the receiver's connections. If so, operation proceeds to a step 510. However, as alternatives, FIG. 5 shows that operation may also proceed to either a step 512 or a step 516, depending on the embodiment. Otherwise, FIG. 5 shows that if there is no such overlapping, operation proceeds to a step 518.

In step 510, the receiver determines whether the overlapping allocation of the neighboring device has a priority that is a higher than the receiver's connections. If so, then operation proceeds to step 512. However, as an alternative, FIG. 5 shows that operation may proceed to step 516, depending on the embodiment. Otherwise, if overlapping allocation does not have a higher priority, operation proceeds to step 518. It should also be noted, however, that in certain circumstances, such as in the case of an asymmetric communication link, the operation may (in embodiments) proceed to step 516, even when the priority of the neighboring device is lower that the receiver's connections.

In step 512, the receiver determines whether the overlapping allocation (or reservation) of the neighboring device employs acknowledgments. For example, with reference to MBOA, step 512 may comprise determining whether the overlapping reservation employs an imm-ack or b-ack acknowledgment policy. As will be described below, such determinations may be obtained through information contained in an ACK policy field of a DRP IE. If such acknowledgments are employed, then operation proceeds to step 516. Otherwise, step 518 is performed.

FIG. 5 shows that step 516 is performed when the reallocation condition(s) of step 508, and (in embodiments) steps 510 and/or 512 have been satisfied. In step 516, the receiver and sender engage in communications to reallocate the receiver's communications resources. However, FIG. 5 shows that a step 518 is performed when such conditions are not satisfied. In this step, the device foregoes performing reallocation actions.

Performance of step 516 may be performed in various ways. One way involves the exchange of information through beacon transmissions. For instance, step 516 may comprise the receiver generating and transmitting an updated availability information element (AIE) during its beacon slot. Alternatively, step 516 may comprise the receiver generating and transmitting an updated and modified DRP IE. As a further alternative, step 516 may comprise the receiver generating and transmitting both an updated AIE and an updated and modified DRP IE. Also, the receiving device may receive a DRP IE from the transmitting device.

IV. Availability and DRP Information Elements

According to the current MBOA MAC specification, the AIE is used by a device to indicate its view of the current utilization of MAS in the device's superframe. The format of the AIE is shown below in Table 1.

TABLE 1

| AIE Format | | |
|---|---|---|
| Octets: 32 | 1 | 1 |
| Availability Bitmap | Length (=x) | Element ID |

As shown in Table 1, an AIE has an availability bitmap that is 256 bits long. Each of these bits corresponds to each MAS in the superframe. More particularly, each bit in the bitmap indicates the availability of the device for the corresponding MAS. For instance, a '0' indicates that the device is available during the corresponding MAS, and a '1' indicates that the device is not available during the corresponding MAS.

Thus in step 516, the sender may receive an AIE that indicates the existence of interfering allocations. Currently, the MBOA MAC specifies limited uses for the AIE. During a unicast DRP negotiation, a device is required respond to a requesting device with an AIE if the request cannot be completely accepted. This requirement may arise when the responding device is unable to accept the request due to conflict with other reservations. Otherwise, transmission of AIEs is optional. The transmitting device can make use of the receiver's AIE to make new reservations or modifications for the MAS slots that are free for the receiver. Accordingly, step 516, may further comprise the receiving device sending a modified DRP IE in the next superframe.

The format of a DRP of the MBOA MAC proposal is now described. Table 2, below, illustrates the format of a DRP IE.

TABLE 2

| Distributed Reservation Protocol Information Element Format | | | | | |
|---|---|---|---|---|---|
| Octets: 2 | 2 | 2 | 3 | 1 | 1 |
| DRP Reservation 1 | ... DRP Reservation N | Destination/ Source DEVID | DRP Control | Length (=x) | Element ID |

Table 2 shows that the DRP IE includes one or more DRP Reservation fields, each being 2 octets in length. The format of this field is shown below in Table 3.

TABLE 3

| DRP Reservation field Format | |
|---|---|
| Octets: 1 | 1 |
| DRP Length | DRP Offset |

The DRP Offset field in Table 3 defines the starting time of the planned transmission. It shall be set to the slot number of the first reservation slot, which is defined relative to the beacon period start time (BPST). The DRP length field in Table 3 contains, in multiples of data slots, the duration of the reservation.

Table 2 also shows that the DRP IE includes a three octet DRP control field. The format of this field is illustrated below in Table 4.

TABLE 4

DRP Control Field Format

| Bits: 8 | 5 | 5 | 4 | 1 | 1 |
|---|---|---|---|---|---|
| Reserved | StreamID | Priority | Type | ACK Policy | Tx/Rx |

In the DRP control field, the Tx/Rx bit is set to '0' if the device is the sender of the planned transmission, and it is set to '1' if the device is a receiver. This bit is only decoded if the reservation is of type Hard, or type Soft. The ACK (acknowledgment) policy bit of the DRP control field is set to '0' for unicast reservations having a No-ACK policy and for multicast or broadcast reservations. However, this bit is set to '1' for unicast reservations with Imm-ACK or B-ACK policies. The ACK policy bit is only decoded if the reservation is of type Hard or type Soft. The priority of the transmission is set by the DRP control field and can have a value between '0' and '7'.

The type field of the DRP control field indicates the type of the reservation and is encoded as shown below in Table 5.

TABLE 5

Types of DRP Reservations

| | |
|---|---|
| 0000 | Beacon Period |
| 0001 | Hard Reservation |
| 0010 | Soft Reservation |
| 0011 | Private Reservation |
| 0100 | Reserved |
| 0101 | Reserved |
| 0110–1111 | Reserved |

The destination/Source DEVID field of the DRP IE is set to the receiver's device ID, multicast-group or broadcast when the device sending the DRP IE is the sender, and is the device ID of the sender when the device sending the DRP IE is a receiver. The DEVID field is only decoded if the reservation is of type Hard, or Soft.

According to aspects of the present invention, when a receiver notices a reservation in its neighborhood (i.e., from a neighboring device) that is overlapping with its own reservation, the receiver informs its transmitter about the collision. This notification may be included in the performance of step 516. In an embodiment, the receiving device points out the colliding MAS slots by leaving the indication of these slots from the DRP IE that it transmits. This provides an indication to the transmitter that those particular slots are not to be used for transmitting data to the receiver. In a further embodiment, the receiving device points out the colliding MAS slots as unavailable in a bit vector that it transmits in an AIE. However, in further embodiments of the present invention, the receiver points out the colliding slots by both leaving the colliding slots out of the DRP IE and sending an AIE that indicates the colliding slots as unavailable. This helps the transmitter identify any free MAS slots.

V. Receiver Initiated Negotiation

Figure 6:
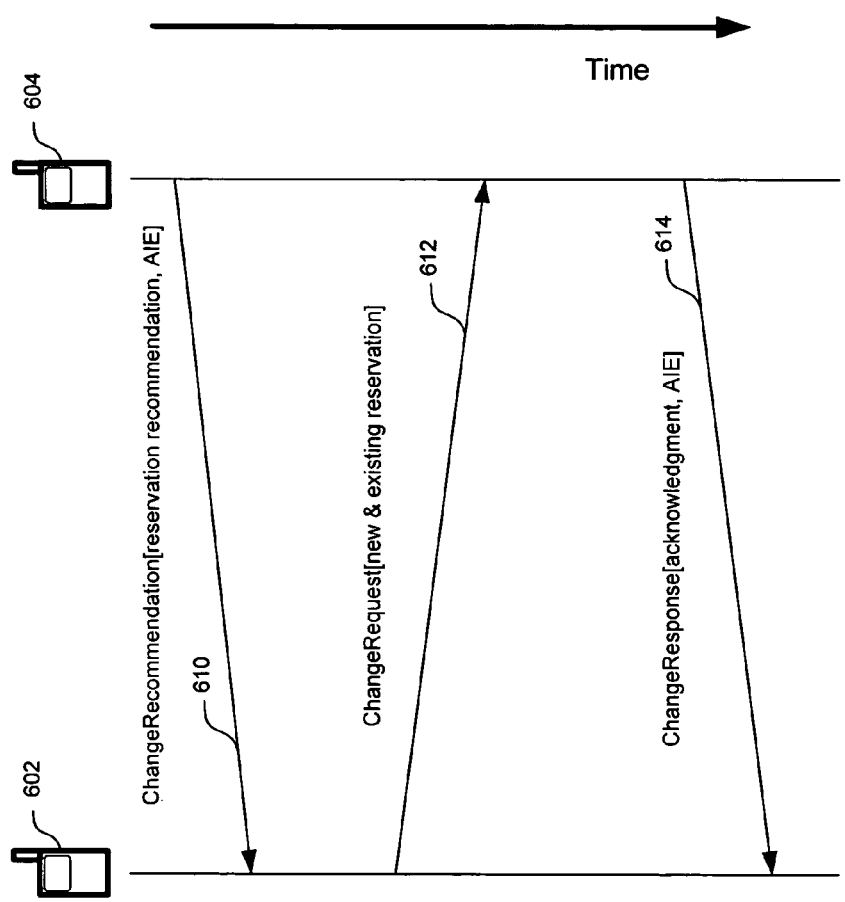
FIG. 6 is a flowchart of a device operation, according to a further embodiment of the present invention.

A further alternative for performing step 516 involves the receiver-initiated exchange of messages between the receiver and the sender. Accordingly, FIG. 6 is a diagram showing an interaction between a transmitting device 602 and a receiving device 604 that involves the exchange of such messages. These messages may be exchanged through beacon transmissions. Alternatively, these messages may be exchanged through allocated communications bandwidth (i.e., existing reservations). An advantage of this interaction is that it may save time (i.e., one superframe) over the aforementioned AIE approach, which involves the DRP reservation mechanism.

The interaction of FIG. 6 includes multiple steps. For instance, in a step 610, receiving device 604 sends a ChangeRecommendation message to transmitting device 604. As shown in FIG. 6, the ChangeRecommendation message includes a reservation recommendation parameter and an AIE. The reservation recommendation parameter indicates which MAS slots the receiver is recommending and the AIE shows all the possibilities.

Transmitting device 602 receives and processes this message. Based on this, transmitting device 602 generates and sends a ChangeRequest message in a step 612. As shown in FIG. 6, this message includes the newly requested reservations (allocations) as well as the current ones.

Upon receipt of the ChangeRequest message, the receiving device determines whether to accept this request. If accepted, receiving device 604 sends a ChangeResponse message to transmitting device 602 in a step 614.

VI. Device Implementation

Figure 7:
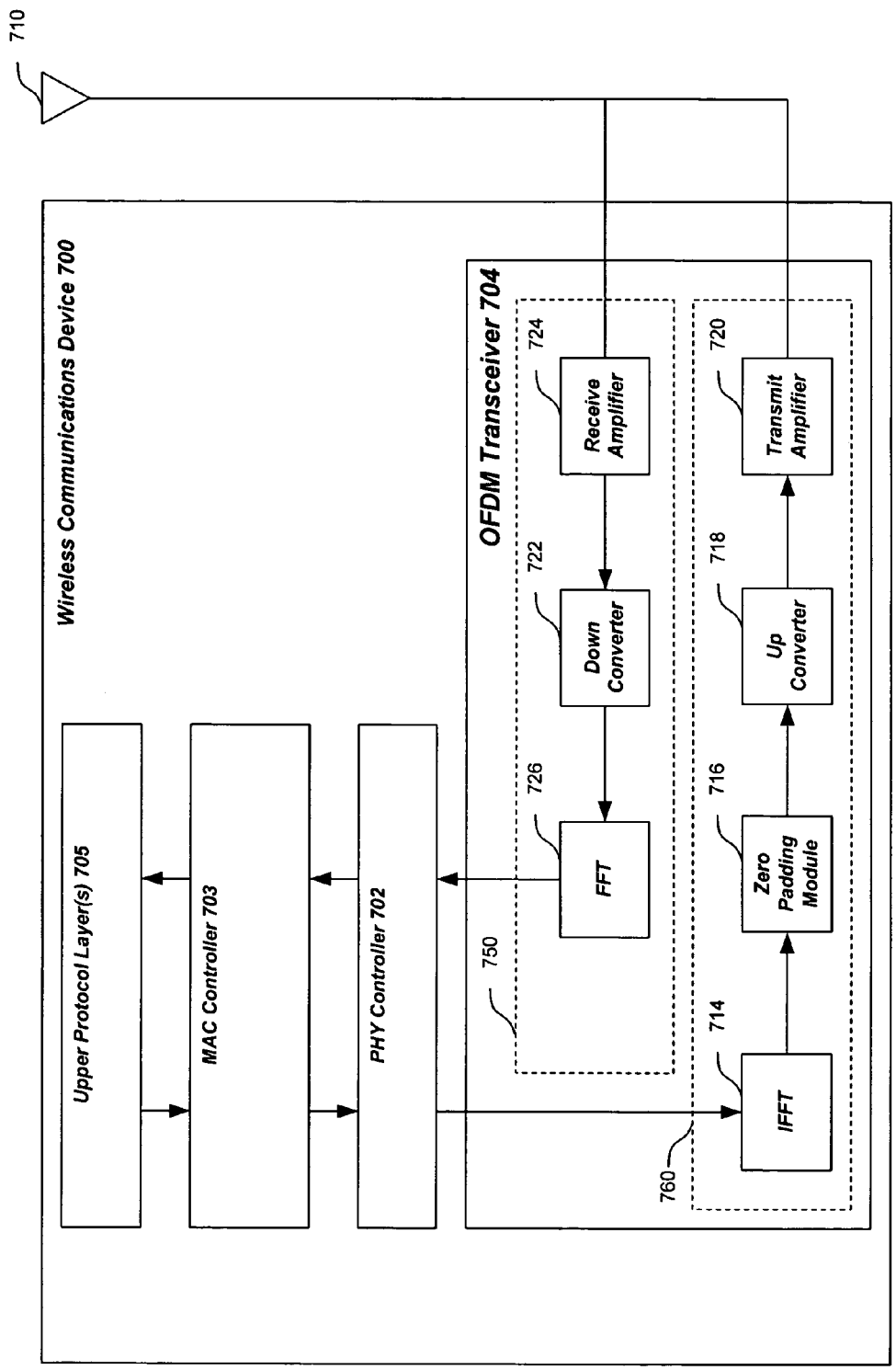
FIG. 7 is a block diagram of an exemplary wireless communications device architecture according to an embodiment of the present invention.

FIG. 7 is a diagram of a wireless communications device 700, which may operate according to the techniques of the present invention. This device may be used in various communications environments, such as the environment of FIG. 1. As shown in FIG. 7, device 700 includes a physical layer (PHY) controller 702, a media access controller (MAC) 703, an OFDM transceiver 704, upper protocol layer(s) 705, and an antenna 710.

MAC controller 703 generates frames (data transmissions) and beacons for wireless transmission. In addition, MAC controller 703 receives and processes frames and beacon transmissions that are originated from remote devices. MAC controller 703 exchanges these frames and beacon transmissions with PHY controller 702. In turn, PHY controller 702 exchanges frames and beacon transmissions with OFDM transceiver 704. Further, MAC controller 703 identifies interfering conditions and initiates the removal of such conditions. For example, in embodiments, MAC controller 703 may perform steps of FIG. 5.

FIG. 7 shows that OFDM transceiver 704 includes a receiver portion 750 and a transmitter portion 760. Transmitter portion 760 includes an inverse fast fourier transform (IFFT) module 714, a zero padding module 716, an upconverter 718, and a transmit amplifier 720. IFFT module 714 receives frames for transmission from PHY controller 702. For each of these frames, IFFT module 714 generates an OFDM modulated signal. This generation involves performing one or more inverse fast fourier transform operations. As a result, this OFDM modulated signal includes one or more OFDM symbols. This signal is sent to zero padding module 716, which appends one or more "zero samples" to the beginning of each OFDM symbol to produce a padded modulated signal. Upconverter 718 receives this padded signal and employs carrier-based techniques to place it into one or more frequency bands. These one or more frequency bands are determined according to a frequency hopping pattern, such as one or more of the TFCs. As a result, upconverter 718 produces a frequency hopping signal, which is amplified by transmit amplifier 720 and transmitted through antenna 710.

FIG. 7 shows that receiver portion 750 includes a downconverter 722, a receive amplifier 724, and a fast fourier transform (FFT) module 726. These components (also referred to as a receiver) are employed in the reception of wireless signals from remote devices. In particular, antenna 710 receives wireless signals from remote devices that may employ frequency hopping patterns, such as one or more of the TFCs. These signals are sent to amplifier 724, which generates amplified signals. Amplifier 724 sends the amplified signals to downconverter 722. Upon receipt, downconverter 722 employs carrier-based techniques to convert these signals from its one or more frequency hopping bands (e.g., TFC bands) into a predetermined lower frequency range. This results in modulated signals, which are received by FFT module 726, which performs OFDM demodulation on these signals. This demodulation involves performing a fast fourier transform for each symbol that is conveyed in the amplified signals.

As a result of this demodulation, FFT module 726 produces one or more frames, which are sent to PHY controller 702. These frames may convey information, such as payload data and protocol header(s). Upon receipt, PHY controller 702 processes these frames. This may involve removing certain PHY layer header fields, and passing the remaining portions of the frames to MAC controller 703.

As shown in FIG. 7, device 700 further includes one or more upper protocol layers 705. These layers may involve, for example, user applications. Accordingly, upper layers 705 may exchange information with remote devices. This involves layer(s) 705 exchanging protocol data units with MAC controller 703. In turn, MAC controller 703 operates with PHY controller 702 and transceiver 704 to transmit and receive corresponding wireless signals.

The devices of FIG. 7 may be implemented in hardware, software, firmware, or any combination thereof. For instance, upconverter 718, transmit amplifier 720, receive amplifier 724, and downconverter 722 may include electronics, such as amplifiers, mixers, and filters. Moreover, implementations of device 700 may include digital signal processor(s) (DSPs) to implement various modules, such as scanning module 706, IFFT module 714, zero padding module 716, and FFT module 726. Moreover, in embodiments of the present invention, processor(s), such as microprocessors, executing instructions (i.e., software) that are stored in memory (not shown) may be used to control the operation of various components in device 700. For instance, components, such as PHY controller 702 and MAC controller 703, may be primarily implemented through software operating on one or more processors.

Figure 8:
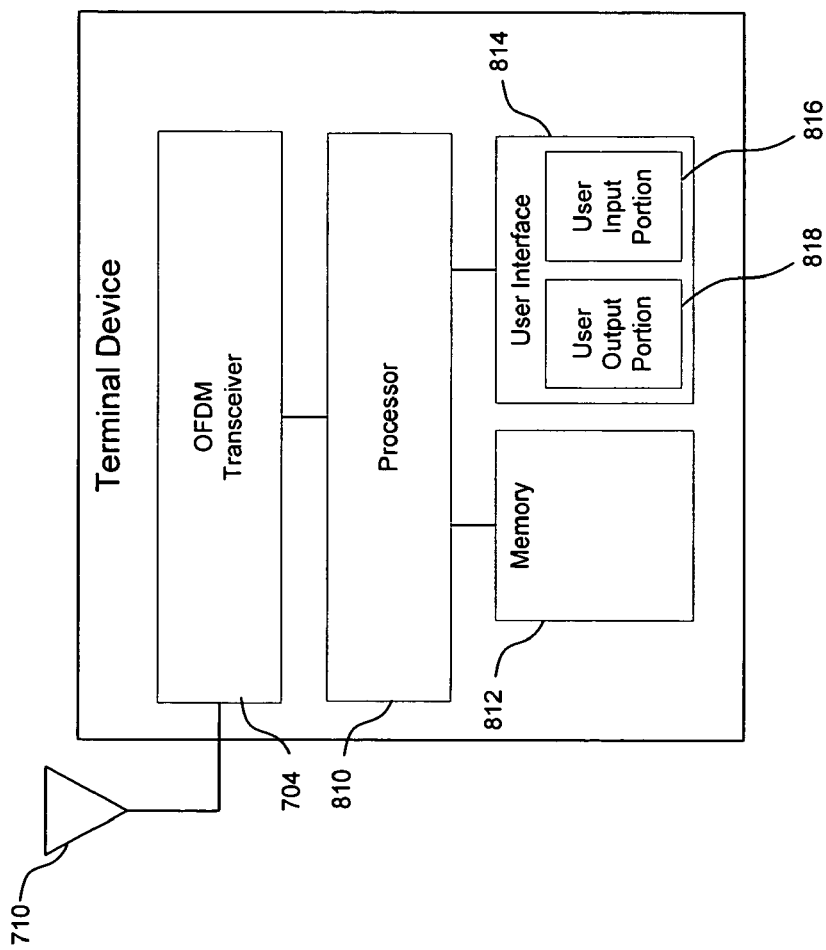
FIG. 8 is a block diagram of an exemplary implementation of a wireless communications device according to an embodiment of the present invention.

One such implementation of the FIG. 7 architecture is shown in FIG. 8. This diagram illustrates the terminal device implemented according to one embodiment of the present invention. As shown in FIG. 8, this implementation includes a processor 810, a memory 812, and a user interface 814. In addition, the implementation of FIG. 8 includes OFDM transceiver 704 and antenna 710. These components may be implemented as described above with reference to FIG. 7. However, the implementation of FIG. 8 may be modified to include different transceivers that support other wireless technologies.

Processor 810 controls device operation. As shown in FIG. 8, processor 810 is coupled to transceiver 704. Processor 810 may be implemented with one or more microprocessors that are each capable of executing software instructions stored in memory 812, for example, as a computer system.

Memory 812 includes random access memory (RAM), read only memory (ROM), and/or flash memory, and stores information in the form of data and software components (also referred to herein as modules). These software components include instructions that can be executed by processor 810. Various types of software components may be stored in memory 812. For instance, memory 812 may store software components that control the operation of transceiver 704. Also, memory 812 may store software components that provide for the functionality of PHY controller 702, MAC controller 703, and upper protocol layer(s) 705.

In addition, memory 812 may store software components that control the exchange of information through user interface 814. As shown in FIG. 8, user interface 814 is also coupled to processor 810. User interface 814 facilitates the exchange of information with a user. FIG. 8 shows that user interface 814 includes a user input portion 816 and a user output portion 818.

User input portion 816 may include one or more devices that allow a user to input information. Examples of such devices include keypads, touch screens, and microphones. User output portion 818 allows a user to receive information from the device. Thus, user output portion 818 may include various devices, such as a display, and one or more audio speakers (e.g., stereo speakers) and a audio processor and/or amplifier to drive the speakers. Exemplary displays include color liquid crystal displays (LCDs), and color video displays.

The elements shown in FIG. 8 may be coupled according to various techniques. One such technique involves coupling transceiver 704, processor 810, memory 812, and user interface 814 through one or more bus interfaces. In addition, each of these components is coupled to a power source, such as a removable and/or rechargeable battery pack (not shown).

VII. Conclusion

While various embodiments of the present invention have been described above, it should be understood that they have been presented by way of example only, and not in limitation. For instance, although examples have been described involving MBOA communications, other short-range and longer-range communications technologies are within the scope of the present invention. Moreover, the techniques of the present invention may be used with signal transmission techniques other than OFDM.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a wireless communications device, the method comprising:

(a) receiving data transmissions from a transmitting device across a distributedly controlled wireless communications network, the data transmissions corresponding to a connection with the transmitting device and occurring within a reserved portion of a communications resource, wherein control of the communication resource is shared between devices belonging to said wireless communication network;

(b) detecting an interference condition, wherein the interference condition includes an allocation of the communications resource for a neighboring device overlapping with the reserved portion; and (c) sending a notification to the transmitting device, the notification indicating the presence of overlapping transmissions in the reserved portion of the communications resource, the devices receiving the data transmissions in the form of orthogonal frequency division multiplexing (OFDM) signals, wherein step (c) further comprises transmitting an indication of non-overlapping reserved portions of the communications resource for the wireless communications device.

2. The method of claim 1, wherein the interference condition further includes the allocation of the communications resource for the neighboring device having a higher priority than the connection with the transmitting device.

3. The method of claim 2, wherein the interference condition further includes the allocation of the communications resource for the neighboring device having an acknowledgment setting.

4. The method of claim 1, wherein step (c) comprises sending a transmission during a portion of the communications resource allocated to non-payload transmissions.

5. The method of claim 4, wherein the portion of the communications resource allocated to non-payload transmissions is a periodically occurring time slot.

6. The method of claim 5, wherein the periodically occurring time slot is a beacon slot.

7. The method of claim 4, wherein step (c) comprises transmitting an availability information element (AIE) during the portion of the communications resource allocated to non-payload transmissions.

8. The method of claim 7, wherein the AIE includes a plurality of bits, wherein each of the plurality of bits indicates a reservation status of a corresponding portion of the communications resource.

9. The method of claim 7, wherein step (c) further comprises transmitting a modified distributed reservation protocol information element (DRP IE), the modified DRP IE providing indications of overlapping reserved portions of the communications resource for the wireless communications device.

10. The method of claim 9, wherein the modified DRP IE indicates the overlapping reserved portions of the communications resource by leaving out indications of corresponding media access slots (MASs).

11. The method of claim 7, further comprising:
receiving a distributed reservation protocol information element (DRP IE) from the transmitting device, the DRP IE reserving a new portion of the communications resource to receive data transmissions from the transmitting device.

12. The method of claim 11, wherein the DRP IE is received during a second portion of the communications resource allocated to non-payload transmissions from the transmitting device.

13. The method of claim 1, wherein the wireless communications network is an IEEE 802.15.3a network.

14. The method of claim 1, wherein the indication is included in a modified distributed reservation protocol information element (DRP IE).

15. The method of claim 14, wherein the modified DRP IE indicates the overlapping reserved portions of the communications resource by leaving out indications of corresponding media access slots (MASs).

16. The method of claim 1, further comprising:
(d) reserving a new portion of the communications resource to receive data transmissions from the transmitting device.

17. The method of claim 16, wherein step (d) comprises receiving a distributed reservation protocol information element (DRP IE) from the transmitting device, the DRP IE indicating the new portion of the communications resource.

18. An apparatus, comprising:
a receiver configured to receive data transmissions from a transmitting device across a distributedly controlled wireless communications network, the data transmissions corresponding to a connection with the transmitting device and occurring within a reserved portion of a communications resource, wherein control of the communication resource is shared between devices belonging to said wireless communication network;
a controller configured to detect an interference condition, wherein the interference condition includes an allocation of the communications resource for a neighboring device that overlaps with the reserved portion; and
a transmitter configured to send a notification to the transmitting device, the notification indicating the presence of overlapping transmissions in the reserved portion of the communications resource, wherein the receiver is further configured to receive the data transmissions from the transmitting device in the form of orthogonal frequency division multiplexing (OFDM) signals, and wherein the notification includes an indication of non-overlapping reserved portion of the communications resource for the wireless communication device.

19. The apparatus of claim 18, wherein the interference condition further includes the allocation of the communications resource for the neighboring device having a higher priority than the connection with the transmitting device.

20. The apparatus of claim 19, wherein the interference condition further includes the allocation of the communications resource for the neighboring device having an acknowledgment setting.

21. The apparatus of claim 18, wherein the transmitter is further configured to send the notification during a portion of the communications resource allocated to non-payload transmissions.

22. The apparatus of claim 21, wherein the portion of the communications resource allocated to non-payload transmissions is a periodically occurring time slot.

23. The apparatus of claim 22, wherein the periodically occurring time slot is a beacon slot.

24. The apparatus of claim 21, wherein the notification includes an availability information element (AIE) transmitted during the portion of the communications resource allocated to non-payload transmissions.

25. The apparatus of claim 24, wherein the AIE includes a plurality of bits, wherein each of the plurality of bits indicates a reservation status of a corresponding portion of the communications resource.

26. The apparatus of claim 24, wherein the notification further includes a modified distributed reservation protocol information element (DRP IE), the modified DRP IE providing indications of overlapping reserved portions of the communications resource for the wireless communications device.

27. The apparatus of claim 26, wherein the modified DRP IE indicates the overlapping reserved portions of the communications resource by leaving out indications of corresponding media access slots (MASs).

28. The apparatus of claim 24, wherein the receiver is further configured to receive a distributed reservation protocol information element (DRP IE) from the transmitting device, the DRP IE reserving a new portion of the communications resource to receive data transmissions from the transmitting device.

29. The apparatus of claim 28, wherein the DRP IE is received during a second portion of the communications resource allocated to non-payload transmissions from the transmitting device.

30. The apparatus of claim 18, wherein the wireless communications network is an IEEE 802.15.3a network.

31. The apparatus of claim 18, wherein the indication is included in a modified distributed reservation protocol information element (DRP IE).

32. The apparatus of claim 31, wherein the modified DRP IE indicates the overlapping reserved portions of the communications resource by leaving out indications of corresponding media access slots (MASs).

33. A computer system, comprising:
a receiver configured to receive data transmissions from a transmitting device across a distributedly controlled wireless communications network, the data transmissions corresponding to a connection with the transmitting device and occurring within a reserved portion of a communications resource, wherein control of the communication resource is shared between devices belonging to said wireless communication network;
a processor;
a memory, the memory storing instructions for the processor to detect an interference condition, wherein the interference condition includes an allocation of the communications resource for a neighboring device that overlaps with the reserved portion; and
a transmitter configured to send a notification to the transmitting device, the notification indicating the presence of overlapping transmissions in the reserved portion of the communications resource, wherein the notification includes an indication of non-overlapping reserved portions of the communications resource for the wireless communications device.

34. The computer system of claim 33, wherein the interference condition further includes the allocation of the communications resource for the neighboring device having a higher priority than the connection with the transmitting device.

35. The computer system of claim 34, wherein the interference condition further includes the allocation of the communications resource for the neighboring device having an acknowledgment setting.

36. The computer system of claim 33, wherein the indication is included in a modified distributed reservation protocol information element (DRP IE).

37. The computer system of claim 33, wherein the transmitter is further configured to send the notification during a portion of the communications resource allocated to non-payload transmissions.

38. The computer system of claim 33, wherein the notification includes an availability information element (AIE) transmitted during the portion of the communications resource allocated to non-payload transmissions.

39. The computer system of claim 33, wherein the notification further includes a modified distributed reservation protocol information element (DRP IE), the modified DRP IE providing indications of overlapping reserved portions of the communications resource for the wireless communications device.

40. A computer reader useable medium having computer program logic recorded thereon for enabling a processor in a computer system to reduce interference in a distributedly controlled wireless communications network, the computer program logic comprising:
program code for enabling the processor to receive data transmissions from a transmitting device across the distributedly controlled wireless communications network, the data transmissions corresponding to a connection with the transmitting device and occurring within a reserved portion of a communications resource, wherein control of the communication resource is shared between devices belonging to said wireless communication network;
program code for enabling the processor to detect an interference condition, wherein the interference condition includes an allocation of the communications resource for a neighboring device overlapping with the reserved portion;
program code for enabling the processor to send a notification to the transmitting device, the notification indicating the presence of overlapping transmissions in the reserved portion of the communications resource; and
program code for transmitting an indication of non-overlapping reserved portions of the communications resource for the wireless communications device wherein the indication is included in a modified distributed reservation protocol information element (DRP IE), and wherein the modified DRP IE indicates the overlapping reserved portions of the communications resource by leaving out indications of corresponding media access slots (MASs).

* * * * *